US007007687B2

(12) United States Patent
Lewis

(10) Patent No.: US 7,007,687 B2
(45) Date of Patent: Mar. 7, 2006

(54) CAMPFIRE GRILLING DEVICE

(76) Inventor: Kevin A. Lewis, 1393 Dodds Dr., Woodland, CA (US) 95776

( * ) Notice: Subject to any disclaimer, the term of this patent is extended or adjusted under 35 U.S.C. 154(b) by 419 days.

(21) Appl. No.: 10/354,450

(22) Filed: Jan. 29, 2003

(65) Prior Publication Data
US 2004/0144379 A1 Jul. 29, 2004

(51) Int. Cl.
F24B 3/00 (2006.01)
(52) U.S. Cl. .................. 126/30; 126/25 R; 126/9 R
(58) Field of Classification Search ............. 126/25 R, 126/30, 9 R, 25 A, 25 AA, 9 B; 248/156
See application file for complete search history.

(56) References Cited

U.S. PATENT DOCUMENTS

| | | | | |
|---|---|---|---|---|
| 2,844,139 | A | * | 7/1958 | Lucas .......................... 126/30 |
| D186,487 | S | | 10/1959 | Brooks |
| D191,186 | S | | 8/1961 | Maki |
| 3,067,734 | A | | 12/1962 | Lucas |
| 3,152,536 | A | * | 10/1964 | Lucas .......................... 99/397 |
| 4,741,985 | A | * | 5/1988 | Aoai et al. .................. 430/175 |
| 4,896,651 | A | | 1/1990 | Kott, Jr. |
| 4,979,490 | A | | 12/1990 | Nudo et al. |
| D341,065 | S | * | 11/1993 | Martner ....................... D7/690 |
| D341,297 | S | * | 11/1993 | Martner ....................... D7/688 |
| D342,184 | S | | 12/1993 | Sanchez |
| 5,307,797 | A | | 5/1994 | Kleefeld |
| D369,939 | S | | 5/1996 | Gibbs |
| 5,666,940 | A | | 9/1997 | Kreiter |
| 5,729,854 | A | * | 3/1998 | Powers .......................... 7/109 |
| D396,379 | S | | 7/1998 | Stoetzl |
| 5,819,718 | A | | 10/1998 | Leiser |
| 5,848,584 | A | * | 12/1998 | Brog ............................ 126/30 |
| 5,944,009 | A | * | 8/1999 | Scheller ........................ 126/30 |
| 6,000,739 | A | * | 12/1999 | Zemit et al. ................... 294/9 |
| 6,006,740 | A | * | 12/1999 | Ulrickson et al. ............ 126/29 |
| 6,068,314 | A | * | 5/2000 | Dorazio et al. ................ 294/9 |
| 6,070,571 | A | | 6/2000 | Bradbury |
| 6,186,137 | B1 | | 2/2001 | Lewis |
| D457,029 | S | | 5/2002 | Wickizer |
| 6,386,192 | B1 | | 5/2002 | Weber |
| 6,485,074 | B1 | * | 11/2002 | Floyd .......................... 294/10 |

* cited by examiner

Primary Examiner—Alfred Basichas
(74) Attorney, Agent, or Firm—Mathew J. Temmerman; Daniel P. Maguire

(57) ABSTRACT

A campfire grilling device comprising (i) a stake, (ii) a slide hammer on the stake, (iii) a horizontal support, with grilling surface, (iv) a frictional engager to hold the horizontal support to the stake, and (v) a grill lifting tool is disclosed. Using the grill lifting tool and a handle on the horizontal support, a campfire cook can easily adjust the height of the grilling surface, even while the campfire is burning. The horizontal support can also be pivoted about the stake, so the grilling surface can be swiveled on or off the fire.

1 Claim, 4 Drawing Sheets

CAMPFIRE GRILLING DEVICE

BACKGROUND OF THE INVENTION

1. Field of the Invention

This invention relates to devices for grilling food over a campfire or other open flame.

2. General Background

Cooking food over a campfire can be an enjoyable experience, but it is often difficult to find a suitable device to hold the food over the fire. Some campfire rings or pits have built-in cooking grates, but many do not, leaving users to devise their own makeshift grill out of clothes hangers, rocks, etc.

Even if a built-in grate is provided, it is often unsuitable for a number of reasons. First, such grates are typically built into the fire pit or ring, so their orientation and height cannot be changed. The position of the grate may be too far or too close to the fire, depending on the intensity of the fire and the desired cooking temperature.

Second, built-in grates are often limited in size, since they can only cover part of the open ring. Especially for large groups, there may simply be too little space on the grate to cook everyone's food.

Third, it can be difficult and dangerous to place or remove food on a built-in grate, because the fire may unexpectedly flare up and burn the cook's hand.

Thus, there is a need for an adjustable campfire grilling device, with sufficient space, and with means to easily remove the device from the flame for placing or removing food.

SUMMARY OF THE INVENTION

The present invention is a campfire grilling device comprising (i) a stake, (ii) a slide hammer on the stake, (iii) a horizontal support with a grilling surface, (iv) a frictional engager, and (iv) a lifting tool. The device can be set up over virtually any fire, and can be used to grill even large items. Using the lifting tool, a campfire cook can easily adjust the height of the grilling surface, even while the campfire is burning.

DETAILED DESCRIPTION

Figure 1:
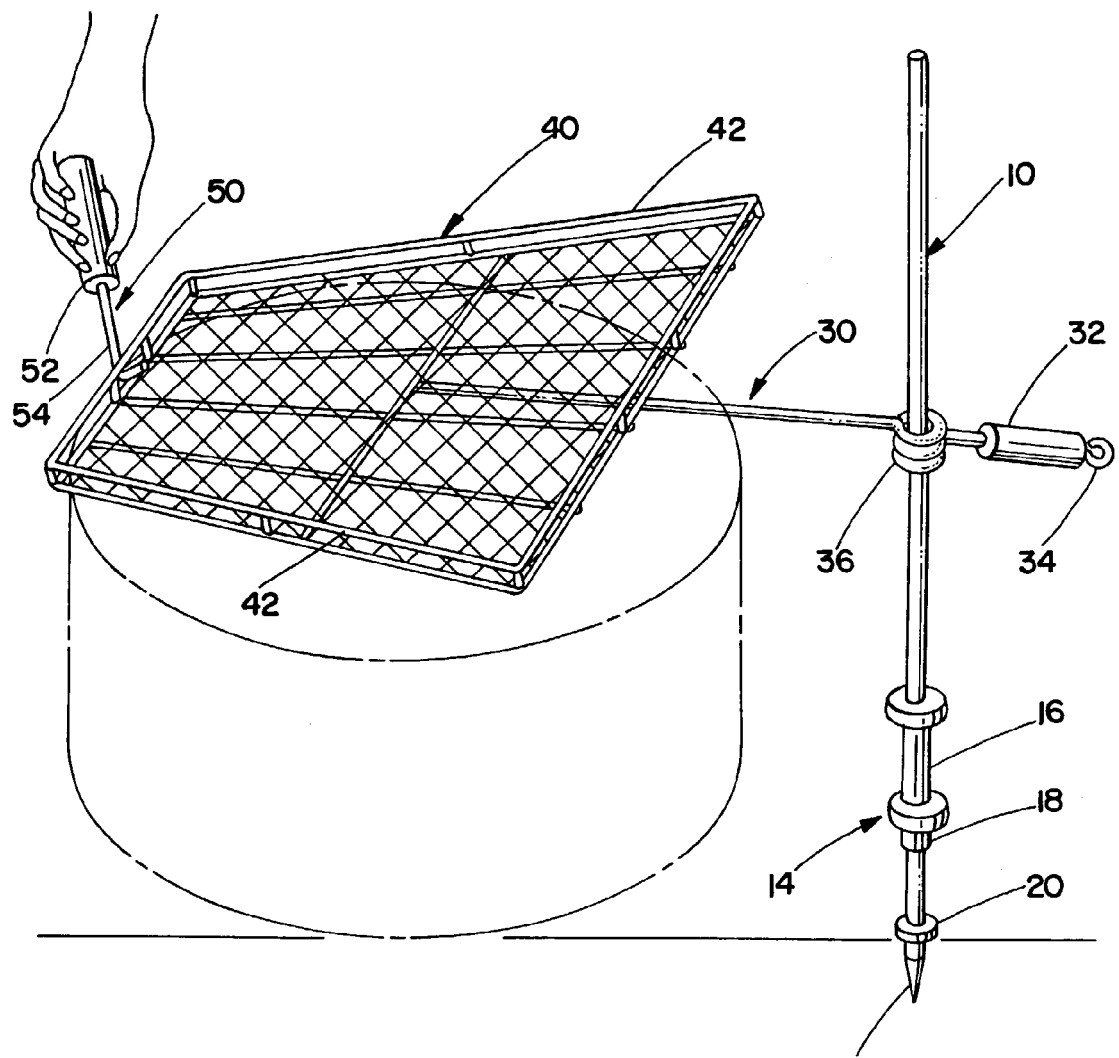
FIG. 1 is a perspective view of a campfire grilling device according to the present invention, placed over a campfire ring, and with the grill lifting device being used to help adjust the position of the grilling surface.
Figure 2:
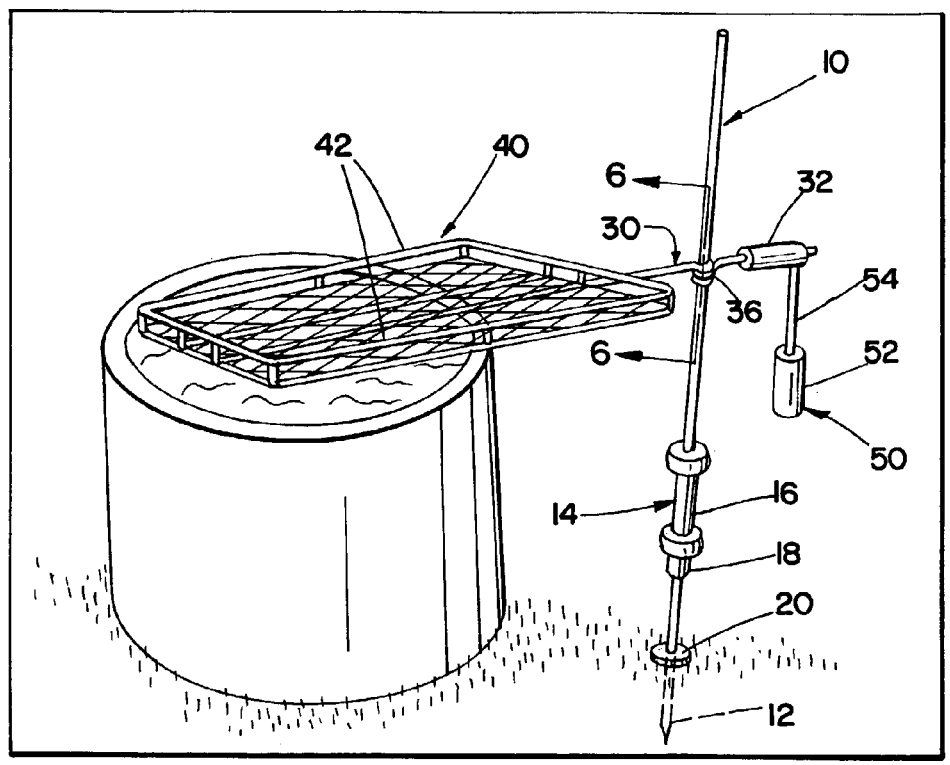
FIG. 2 is a perspective view of a campfire grilling device according to an embodiment of the present invention, placed over a tall campfire ring.
Figure 3:
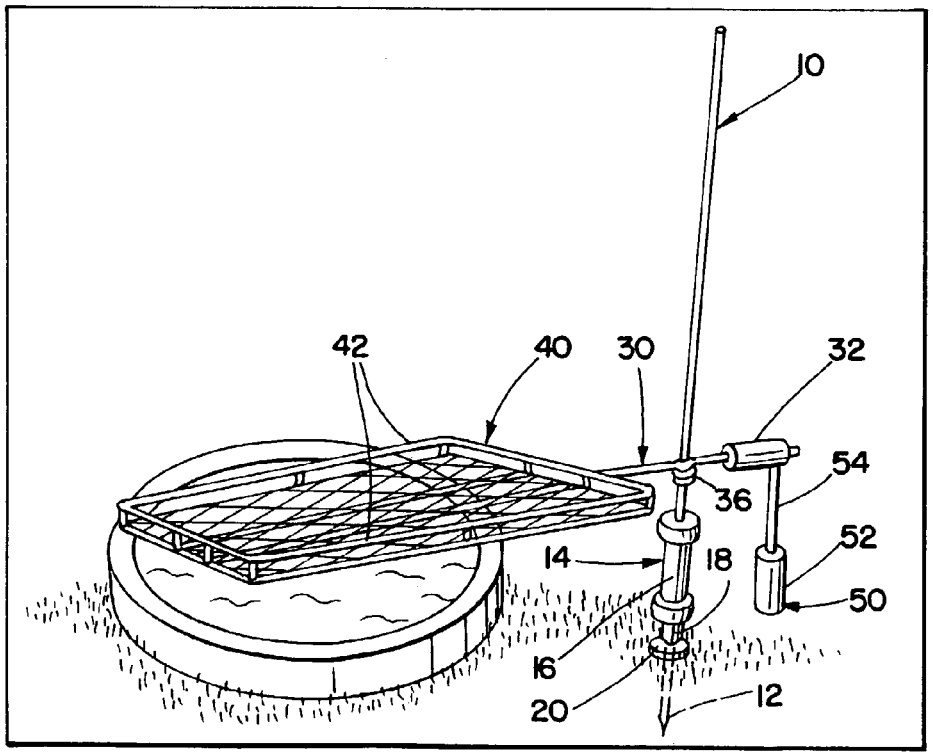
FIG. 3 is a perspective view of a campfire grilling device according to an embodiment of the present invention, placed over a shorter campfire ring.
Figure 4:
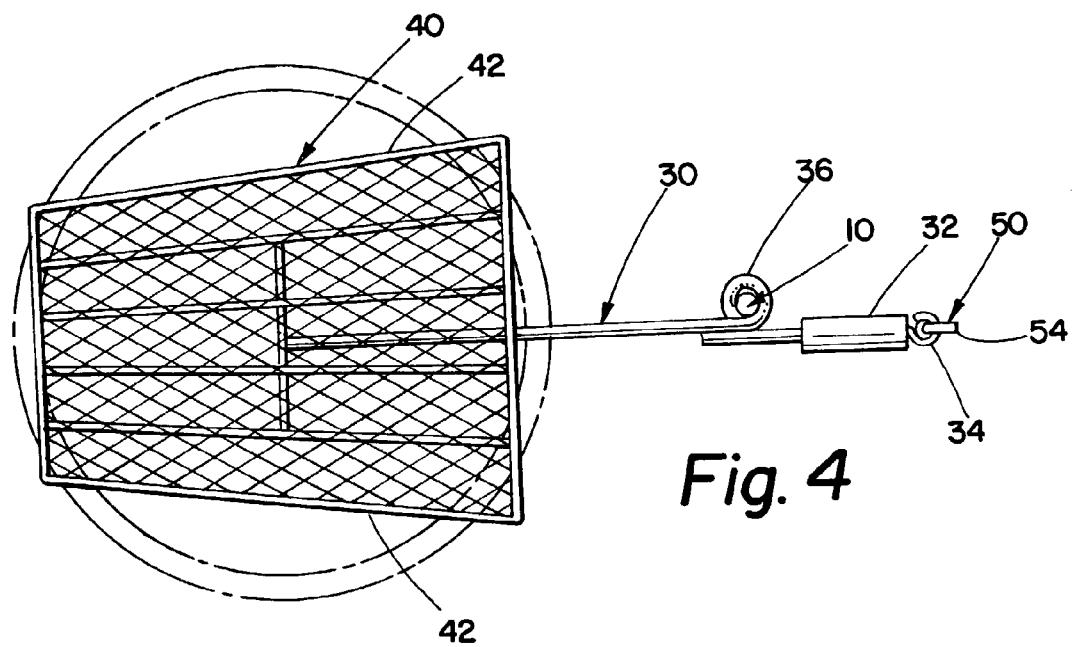
FIG. 4 is a top view of a campfire grilling device according to an embodiment of the present invention.

The present invention is a campfire grilling device comprising a stake 10, a slide hammer 14 on the stake, a horizontal support 30 with a grilling surface 40, a frictional engager such as coil 36, and a lifting tool 50.

Figure 7:
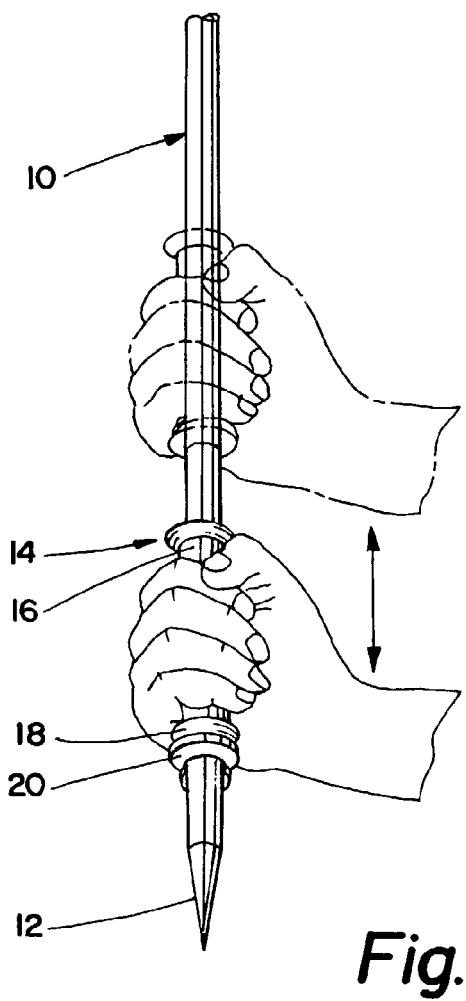
FIG. 7 is a perspective view of the lower end of the stake, showing the slide hammer in operation.

The stake 10 is used to secure the grilling device in the ground. See FIGS. 1, 2, 3, and 7. In one embodiment, when the grilling device is portable, the stake has a point for easy insertion into the soil. See FIGS. 1, 2, 3, and 7. In this embodiment, the stake also may have a slide hammer 14 for pounding the stake into the ground, as illustrated in FIG. 7. If the stake is simply pounded into the ground using a hammer or other striking device, the top of the stake may become flattened, making it difficult or impossible to slide the frictional engager (see below) on or off.

As shown in FIG. 7, the slide hammer 14 has a slidable grip 16 that is held by the user. The slide hammer has a ring 18 at its lower end, and when the slide hammer is pulled down the ring 18 contacts an annular strike plate 20 on the stake 10, thereby driving the stake into ground. See FIG. 7. Therefore, no tools are required to install the device in this embodiment.

Under another embodiment, the stake is permanently placed in the ground near a campfire ring, using concrete or other conventional means. In this embodiment, neither the point 12 nor the slide hammer 14 are needed.

Extending from the stake 10 is a horizontal support 30 with an attached grilling surface 40. The grilling surface may be integral with the horizontal support, or it may be attached in any number of conventional ways, such as by using fasteners.

The horizontal support 30 fits with the stake 10 using a frictional engager. In one embodiment, the frictional engager is a coil 36 that slips over the stake. See FIGS. 1–6. Other frictional engagers include but are not limited to the frictional engagement means disclosed in the following U.S. patents, which are incorporated herein by reference: U.S. Pat. Nos. D457,029, D396,379, 5,307,797, 6,070,571, 4,979,490, 5,819,718, and 6,386,192 B1.

The coil 36 or other frictional engager fits around the stake 10, and so long as the horizontal support 30 is held at a 90° angle to the stake 10, the coil 36 or other frictional engager and thus the horizontal support can be freely lifted up or down. But when the user is not supporting the device, the horizontal support tilts down towards the grilling surface 40, because the grilling surface 40 is longer and heavier than the handle 32. (The stake acts as a fulcrum point). When this happens, the coil 36 or other frictional engager locks onto the stake 10, preventing further movement up or down the stake.

To adjust the height of the grilling surface, the user first may swivel the device about the stake 10 so that it is no longer over the fire. See FIGS. 4 & 5. The user then hooks the grill lifting tool 50 on the distal end of the grilling surface, as shown in FIG. 1. Holding the handle 32, the user then lifts the grill lifting tool 50, releasing the frictional engagement between the coil 36 and the stake 10, thus allowing the grilling surface to be moved up or down by simply moving the tool 50 and the handle 32 in the desired direction.

Figure 5:
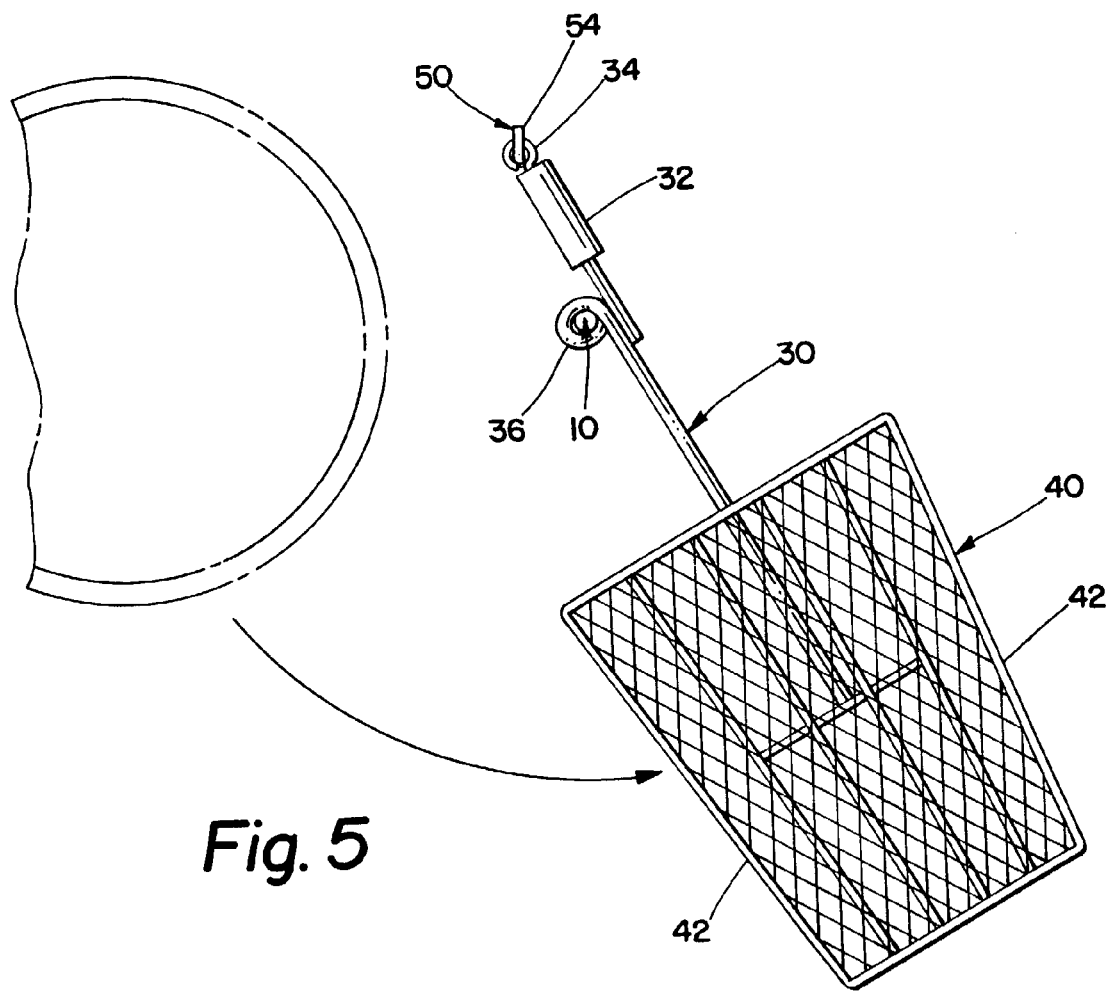
FIG. 5 is also a top view of a campfire grilling device according to an embodiment of the present invention, showing how the grilling device can rotate around the stake.
Figure 6:
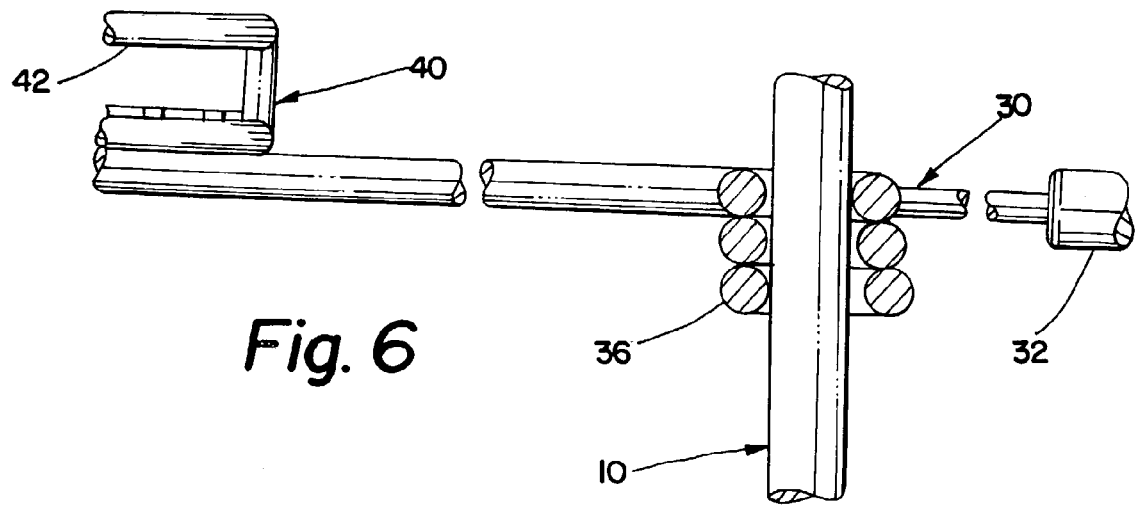
FIG. 6 is a close-up side view of the stake, horizontal support, and grilling surface, with a cross-section of the frictional engagement coil.

The grilling surface may also be swiveled out of the fire to place or remove the food, as shown in FIG. 5.

The grilling surface 40 may have sidewalls 42, and can be any number of shapes and sizes. The grilling surface can be quite large, and indeed can be as large or larger than the opening of the campfire ring over which it is placed.

The grill lifting tool 50 may have a hook handle 52, and a hook 54. See FIG. 1. When not in use, the grill lifting tool can hang from the ring 34. See FIGS. 2 & 3.

The device of the present invention can be completely portable, in that it can be broken down into its component pieces of horizontal support 30 with grilling surface 40, stake 10, and lifting tool 50.

One skilled in the art will appreciate that the present invention can be practiced by other than the preferred embodiments, which are presented for purposes of illustration and not of limitation.

I claim:

1. A method for adjusting the height of a grilling surface over a fire, comprising:

providing a grilling assembly comprising
- a stake;
- a horizontal support with a grilling surface, said horizontal support having a frictional engager for securing the horizontal support to the stake, and said
- a horizontal support having a first end and a first end;
- a handle at said second end; and
- a lifting tool, wherein said lifting tool is not permanently attached to said horizontal support;

engaging said lifting tool at said second end; and adjusting the height of said horizontal support by raising or lowering said handle and said lifting tool.

* * * * *